United States Patent
Gokhale et al.

(10) Patent No.: US 9,988,272 B2
(45) Date of Patent: Jun. 5, 2018

(54) LASER-INDUCED DISSOCIATIVE STITCHING (LDS) FOR SYNTHESIS OF CARBON AND CARBON BASED NANOCOMPOSITES

(71) Applicant: COUNCIL OF SCIENTIFIC AND INDUSTRIAL RESEARCH, New Delhi (IN)

(72) Inventors: Rohan Rajeev Gokhale, Pune (IN); Satishchandra Balkrishna Ogale, Pune (IN)

(73) Assignee: COUNCIL OF SCIENTIFIC AND INDUSTRIAL RESEARCH, New Delhi (IN)

(*) Notice: Subject to any disclaimer, the term of this patent is extended or adjusted under 35 U.S.C. 154(b) by 0 days. days.

(21) Appl. No.: 14/351,811

(22) PCT Filed: Oct. 12, 2012

(86) PCT No.: PCT/IN2012/000681
§ 371 (c)(1),
(2) Date: Apr. 14, 2014

(87) PCT Pub. No.: WO2013/054365
PCT Pub. Date: Apr. 18, 2013

(65) Prior Publication Data
US 2014/0238842 A1    Aug. 28, 2014

(30) Foreign Application Priority Data
Oct. 14, 2011    (IN) .......................... 2959/DEL/2011

(51) Int. Cl.
*B01J 19/12*    (2006.01)
*C01B 31/00*    (2006.01)
(Continued)

(52) U.S. Cl.
CPC ............ *C01B 31/02* (2013.01); *B01J 19/121* (2013.01); *B82Y 30/00* (2013.01); *B82Y 40/00* (2013.01);
(Continued)

(58) Field of Classification Search
CPC . C01B 31/0438; C01B 31/0293; C01B 31/02; C01B 32/18; C01B 32/05;
(Continued)

(56) References Cited

U.S. PATENT DOCUMENTS 4,417,964 A * 11/1983 Wolfrum ................ B01J 19/121
                                                                204/157.61
4,479,859 A * 10/1984 McDonald ............ B01J 19/121
                                                                204/157.61
(Continued)

OTHER PUBLICATIONS

Bystrzejewski M et al: "One-step catalyst-free generation of carbon nanospheres via laser-induced pyrolysis of anthracene," Journal of Solid State Chemistry, Orlando, FL, US, vol. 181, No. 10, Oct. 1, 2008 (Oct. 1, 2008), pp. 2796-2803, XP025534745.
(Continued)

*Primary Examiner* — Ibrahime A Abraham
*Assistant Examiner* — Colleen M Raphael
(74) *Attorney, Agent, or Firm* — Lando & Anastasi, LLP (57) ABSTRACT

Disclosed herein is a process for the synthesis of carbon and carbon based nanocomposites comprising Laser-induced Dissociative Stitching (LDS) from liquid halogen containing aromatic compounds at room temperature.

20 Claims, 13 Drawing Sheets

(51) Int. Cl.
*C01B 31/02* (2006.01)
*B82Y 30/00* (2011.01)
*B82Y 40/00* (2011.01)
*C01B 32/05* (2017.01)
*C01B 32/18* (2017.01)
*C01B 32/182* (2017.01)

(52) U.S. Cl.
CPC ............... *C01B 32/05* (2017.08); *C01B 32/18* (2017.08); *C01B 32/182* (2017.08)

(58) Field of Classification Search
CPC ....... C01B 32/182; B82Y 30/00; B82Y 40/00; B01J 19/121
USPC ........................... 204/157.41, 157.47, 157.61
See application file for complete search history.

(56) References Cited

U.S. PATENT DOCUMENTS

| | | | | |
|---|---|---|---|---|
| 4,755,269 A | * | 7/1988 | Brumer | B01J 19/121 204/157.4 |
| 5,362,450 A | * | 11/1994 | Russell et al. | 422/186.3 |
| 2008/0063585 A1 | * | 3/2008 | Smalley et al. | 977/742 |
| 2010/0243426 A1 | * | 9/2010 | Maekawa et al. | 204/157.41 |
| 2012/0132516 A1 | * | 5/2012 | Zimmerman | B01J 19/121 204/157.41 |

OTHER PUBLICATIONS

J. Pola, M. Urbanova, Z. Bastl, Z. Plzak, J. Subrt, V. Vorlicek, I. Gregora, C. Crowley, R. Taylor: "Laser photolysis of liquid benzene and toluene: Graphitic and polymeric carbon formation at ambient temperature," Carbon, vol. 35, No. 5, 1997, pp. 605-611, XP002697047, col. II, line 21—col. IV, line 25.

Kunihiko Nakayama: "Analysis of photodecomposition of gaseous chlorobenzene by KrF Excimer Laser," Analytical Sciences, vol. 18, Aug. 2002 (Aug. 2002), XP002697048, col. I—col. III, line 22.

Nakamura T et al: "Synthesis of monodispersed DLC nanoparticles in intense optical field by femtosecond laser ablation of liquid benzene," CLEO '07. 2007 Conference on Lasers and Electro-Optics May 5-11, 2007 Baltimore, MD, USA, OSA, Piscataway, NJ, USA, May 6, 2007 (May 6, 2007), pp. 1-2, XP031231725.

Oyama T et al: "Formation of fullerenes by pulsed-laser irradiation of gaseous benzene," Carbon, Elsevier, Oxford, GB, vol. 36, No. 7-8, Jul. 1, 1998 (Jul. 1, 1998), pp. 1236-1238, XP00412400.

* cited by examiner

LASER-INDUCED DISSOCIATIVE STITCHING (LDS) FOR SYNTHESIS OF CARBON AND CARBON BASED NANOCOMPOSITES

CROSS-REFERENCE TO RELATED APPLICATIONS

This application is a U.S. National Stage Application under 35 U.S.C. § 371 of PCT Application Serial No. PCT/IN2012/000681 filed on Oct. 12, 2012, which claims the benefit of priority to Indian Patent Application Serial No. 2959/DEL/2011 filed on Oct. 14, 2011, the entire disclosures of which are hereby incorporated herein by reference in their entireties for all purposes.

The following specification particularly describes the invention and the manner in which it is to be performed.

TECHNICAL FIELD OF THE INVENTION

The present invention relates to a laser photochemical process for the synthesis of carbon and carbon based nanocomposites at room temperature. In particular, the present invention discloses Laser-induced dissociative stitching (LDS) or Pulsed Laser-induced Photochemical Stitching (PLPS), process for the synthesis of micro and nano carbon and carbon based nanocomposites from liquid halogen containing aromatic molecules.

BACKGROUND OF THE INVENTION

Carbon is the most abundant naturally occurring element exhibiting an amazing variety of molecular and structural formulations which find numerous applications in diverse technoiogies. The forms include nanomaterials such as follerenes, nanotubes, graphene, staircase structures, nano-onions, nano-diamonds etc. as well as high surface area layered Configurations, amorphous carbon, porous carbon which can span higher length scales (mesoscopic and microscopic). A number of carbon based composites also find numerous applications in different fields. Such applications are attributable to their interesting mechanical, electrical, thermal, catalytic and optical properties.

These different forms of carbon and carbon based nanocomposites with metals, semiconductors and compounds (oxides, nitrides, carbides etc.) have been generally synthesized by established techniques of carbon synthesis such as carbonization of organic/polymeric precursors, autoclave synthesis from small halogenated aromatic molecules, chemical vapor deposition, excimer laser ablation of graphitic targets, sputtering/plasma methods, arc discharge methods, chemical methods (autoclave) etc.

An article titled "Analysis of photodecomposition of gaseous chlorobenzene by KrF Excimer Laser" by Kunihiko Nakayama et. al in Analytical Sciences, August 2002, Vol. 18 discloses irradiation of gaseous rnonochlorobenzene with KrF excimer laser with a repetition rate of 10 Hz and an high energy fluence of 9.4 mJcm$^3$ under reduced pressure in presence or absence of oxygen to yield carbon dioxide, carbon monoxide, hydrogen chloride, acetylene and benzene and many unidentified products in the solid phase.

An article titled "Laser photolysis of liquid benzene and toluene: Graphitic and polymeric carbon formation at ambient temperature by Pola et al. Carbon 1997, 35, 605 describes a random polymeric/graphitic carbon formation from laser photolysis of benzene and toluene. This process however involves the ArF (193 nm) laser which has higher energy and leads to the breakdown of the aromatic ring as a primary process rather than stitching of the rings.

The methods known for carbon synthesis from the liquid halogen containing aromatic molecules such as halo aromatics, bicyclic rings containing a halogen atom etc. which are toxic in nature and have adverse effect on human health and also has undesirable environmental effects, either require high temperature chemical reactions or involve laser ablation of these liquids in carbon targets.

Thus the technological challenge lies in the synthesis of various carbon forms at low temperature and mild conditions. Furthermore in principle, a complete conversion of liquid materials to solid carbon can be achieved by a cyclic process of solvent irradiation and distillation to recycle the solvent followed by further irradiation. To achieve the desired carbon nanocomposites, the current invention is focused on, hitherto, unexplored use of economical laser photochemistry for photolysis of halogen containing aromatic molecules at low temperature and mild conditions.

OBJECTIVE OF THE INVENTION

The main objective of the present invention is to provide a laser photochemical process for the synthesis of carbon and carbon based nanocomposites at room temperature.

Another objective of the present invention is to provide a new photochemical technique towards the synthesis of carbon nanomaterials from halogen containing small molecules.

SUMMARY OF THE INVENTION

Accordingly, the present invention provides a process for the synthesis of carbon and carbon based nanocomposites using Laser-induced Dissociative Stitching (LDS) from liquid halogen containing aromatic compounds at room temperature.

In an embodiment of the present invention, the Laser-induced Dissociative Stitching process comprises irradiating halogen containing aromatic molecules with an excimer laser source with frequency ranging between 1-50 Hz at room temperature ranging between 25-35 to obtain solid carbon and carbon based nanocomposite material.

In one embodiment of the invention, the Laser-induced Dissociative Stitching process comprises layered, crystalline onion-like intermediates to obtain solid carbon and carbon based nanocomposite material.

In another embodiment of the invention, the excimer laser source is selected from the group consisting of noble gas halide type such as XeCl (308 nm), KrF (248 nm), ArF (193 nm).

In yet another embodiment, the excimer laser source used is preferably KrF (248 nm).

In still another embodiment, the liquid halogen containing aromatic molecules are selected from the group consisting of chlorobenzene, o-Dichlorobenzene, bromobenzene, p-dichlorobenzene, biphenyl containing halogen.

In still another embodiment, the carbon based nanocomposites is prepared by in-situ irradiation of the liquid halo aromatics by including constituent materials or their precursors in the halogen containing aromatic systems wherein the carbon synthesized binds with the constituent materials to give corresponding carbon based nanocomposites.

In still another embodiment, the constituent material is selected from polymers, inorganic compounds and other organic compounds.

In still another embodiment, the excimer laser can be operated either in continuous wave (CW) or pulsed mode of operation.

BRIEF DESCRIPTION OF FIGURES

FIGS. 7 (a) and 7(b) depicts Time dependent UV-Vis absorption spectra.

DETAILED DESCRIPTION OF THE INVENTION

The invention will now be described in detail in connection with certain preferred and optional embodiments, so that various aspects thereof may be more fully understood and appreciated.

The present invention relates to a process for the synthesis of carbon and carbon based nanocomposites involving Laser-induced Dissociative Stitching (LDS) from liquid halogen containing aromatic compounds at room temperature The present invention discloses a novel method of nanocarbon synthesis by laser photochemistry; a process that involves pulsed UV laser irradiation of liquid halogen containing aromatic compounds resulting in the photo-cleavage of the carbon-halogen bond, generating a large number of free radicals and their stitching into nanospheres of carbon. This process is further coined as "Pulsed Laser-induced Photochemical Stitching (PLPS)" technique. Therefore, the term Laser-induced Dissociative Stitching (LDS) as well as "Pulsed Laser-induced Photochemical Stitching (PLPS)" are used interchangeably through-out the text of the specification and a skilled person will appreciate the same as such.

In terms of the basic nature of the primary process, this is to be clearly distinguished from laser induced direct photochemical breaking of C—C bonds of the aromatic rings or laser induced indirect thermal breaking of the C—C bonds, which can also lead to different forms of carbon. However, by the process of the instant invention one can achieve layered (onion-like) intermediates formed by the stitching process which can lead to other forms through secondary absorption.

A laser represents an interesting source of controlled optical energy transfer to any chemical system at room temperature and hence can be envisaged to offer new solutions in the present context. The process of the current invention using the laser photochemistry does not require heating of the reactant environment and the synthesis can be easily tuned by controlling the reactant mixtures, laser energy density, pulsed repetition rate (in the case of pulsed laser) etc.

A novel process of the current invention comprising the Laser-induced Dissociative Stitching (LDS) technology is introduced to engineer solid carbon nanoparticles ranging from size 2 nm to 200 nm from liquid halogen containing aromatic molecules including haloaromatics such as chlorobenzene, o-Dichlorobenzene, bromobenzene, p-dichlorobenzene, biphenyl containing halogen etc. at standard room temperature and laboratory environment (non-inert conditions).

The laser assisted synthesis of composite materials of the current invention is achieved by in-situ irradiation in liquid halo aromatics wherein the carbon synthesized binds with materials such as polymers and other organic compounds.

In an embodiment, the Laser-induced Dissociative Stitching process comprises irradiating halogen containing aromatic molecules with an excimer laser source at room temperature and under non-inert conditions to obtain solid carbon and carbon based nanocomposite material.

The excimer lasers are of the noble gas halide type such as XeCl (308 nm), KrF (248 nm), ArF (193 nm) which can generate significant light intensity in the narrow UV region, preferably KrF. The said lasers have a potential to bring about direct photolysis and photoreaction control in absence of catalysts. The laser wavelength is chosen so as to have photon energy that can dissociate the carbon-halogen bond effectively during the process.

Figure 2:
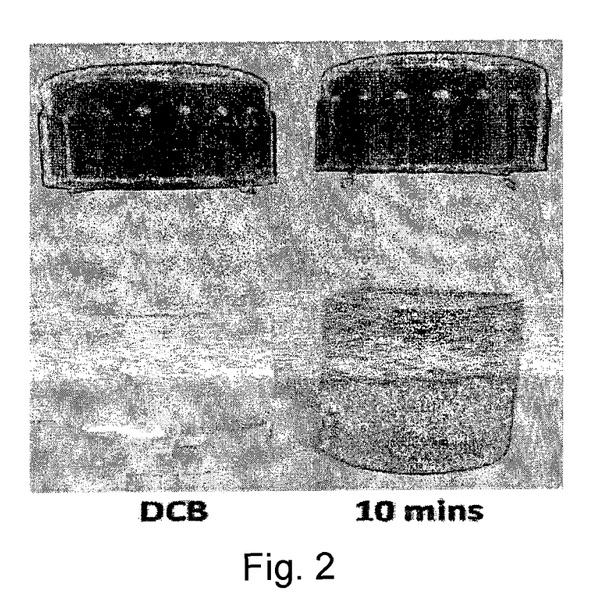
FIG. 2: Photograph of the liquid halobenzenes before and after irradiation showing the black colored carbon formation.
Figure 2A:
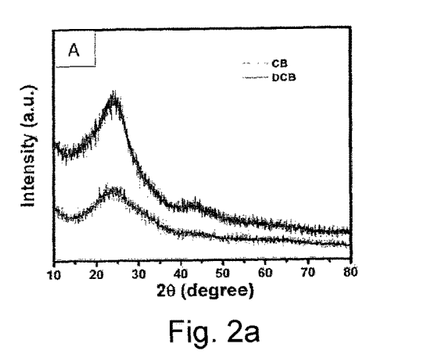
FIG. 2a: depicts X-ray Diffraction study of carbon obtained by laser irradiation of liquid o-Dichlorobenzene (DCB) and chlorobenzene (CB) followed by filtration of the obtained material.
Figure 2B:
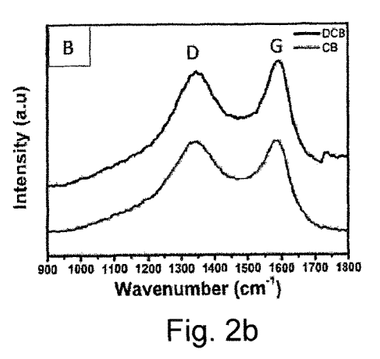
FIG. 2b: depicts Raman study of the carbon obtained by laser irradiation of liquid o-Dichlorobenzene (DCB) and chlorobenzene (CB) followed by filtration of the obtained material.

A sample of transparent liquid halobenzene selected from chlorobenzene (CB) or dichlorobenzene (DCB) is irradiated with high energy photons from a KrF excimer laser source (wavelength-248 nm, frequency-10 Hz) to obtain novel solid carbon material and characterized by XRD (FIG. 2a) and Raman spectroscopy (FIG. 2b). TGA studies on the CNSs obtained from CB and DCB are used to determine their thermal stability in air. It is observed that the CNSs are air stable up to a temperature of 400-450° C. The BET surface area measurement yielded the surface area for CNSs synthesized from CB and DCB to be 38 m$^2$/g and 108 m$^2$/g respectively.

The excimer laser for providing high energy photons can be operated either in continuous wave (CW) or pulsed mode of operation.

Figure 17:
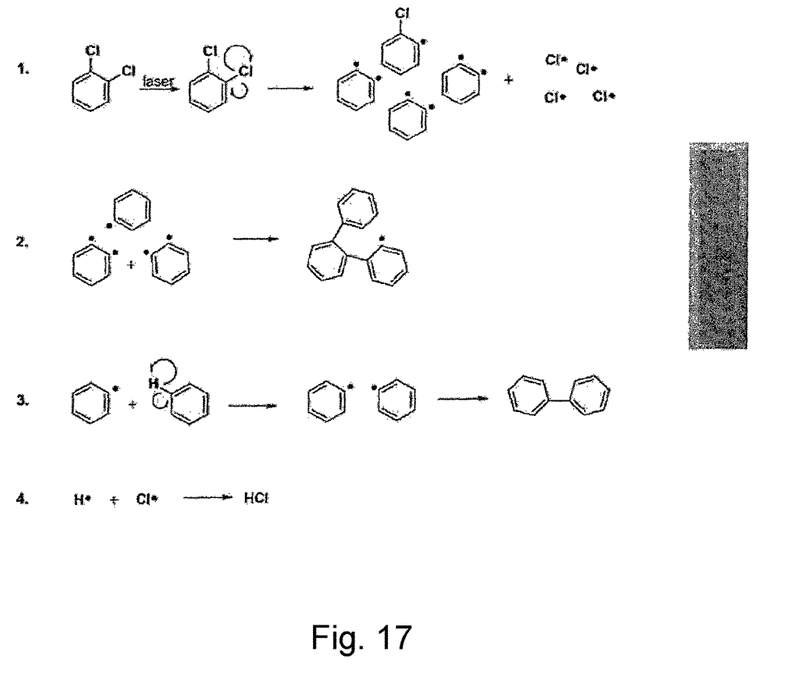
FIG. 17 depicts detailed mechanism of the processes involved in PLPS and the pH paper test. 1. Laser induced photolysis 2. Combination of the generated free radicals 3. Abstraction of H free radicals to form the graphitic network 4. H and Cl radicals combine to give an acidic environment.

The high energy photons from a laser source results in the dissociation of C—Cl bonds in the compound generating a large number of free radicals. The free radicals are stitched into graphitic networks which further curve into nanospheres of carbon. The graphitic stitching process involves the release of H free radicals as well. These H radicals combine with the Cl free radicals to give HCl dissolved in the system. The presence of HCl is confirmed by pH paper test which gives a pink colour indicating a strong acidic environment. Thus free radicals re-organize to form solid carbon structures. Thus various carbon structures by varying precursors (haloaromatic molecules) and laser energy parameters are achieved. Similarly, different carbon-based nano composites are synthesized by the present LDS method by including constituent materials or their precursors in the halogen containing aromatic systems to give corresponding carbon based nanocomposites. (The laser induced stitching process is described in FIG. 17).

Figure 16:
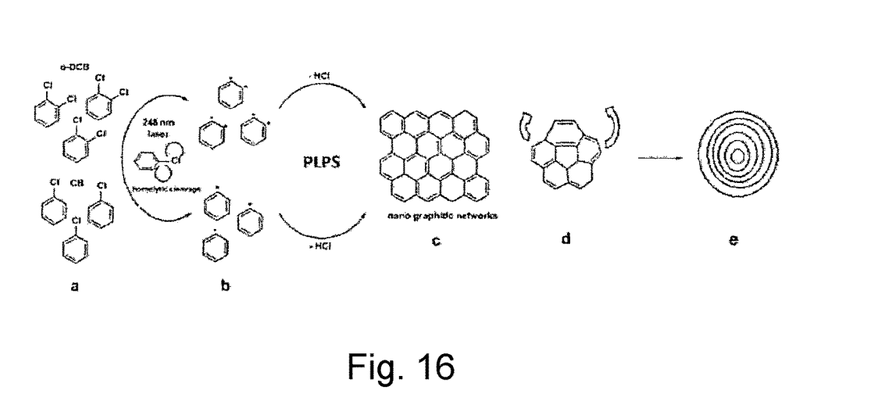
FIG. 16 depicts the process of CNS formation (PLPS); (a) Reactant molecules (b) Photolytically generated free radicals (c) Graphitic networks (d) Curvature around defects (e) Carbon spheres.

To further establish that the nano-carbon formation by stitching process is exclusive to the C—Cl bond and not due to the breakdown of the aromatic ring in the haloaromatic compounds used, a control experiment is performed with benzene (FIG. 16). No optically absorbing (black) compound formation is observed in the irradiation of benzene at 248 nm even after 1 h. This clearly proves that the carbon formed with haloaromatics does not involve the breakage of the carbon bonds in the aromatic ring.

Figure 10:
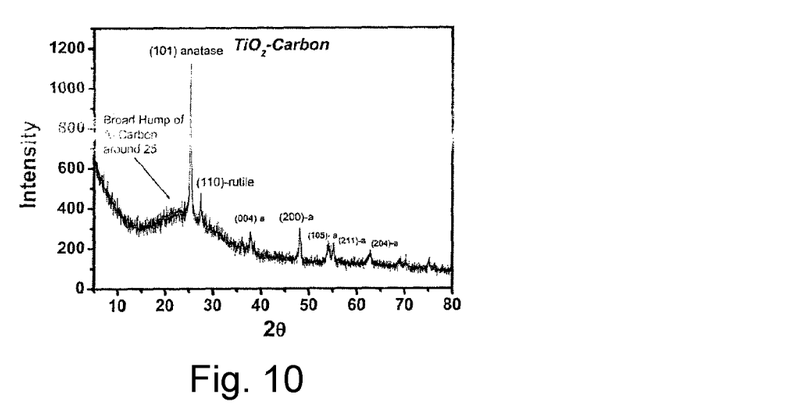
FIG. 10 depicts the XRD of the nanocomposite of Degussa P25 commercial TiO2.
Figure 11:
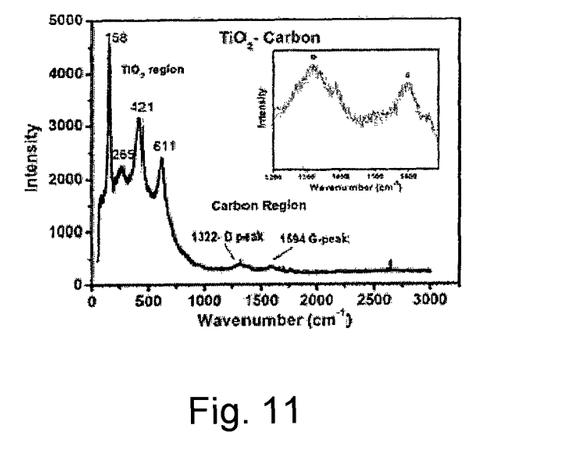
FIG. 11 depicts Raman spectra of Degussa P25 commercial TiO2 Carbon composite.

In an embodiment, the present invention discloses synthesis of carbon-based nanocomposites of Degussa P25 commercial TiO2 with the conducting carbon spheres that are obtained by irradiation of DCB and CB with Degussa P25. The XRD and the Raman spectra are given in FIGS. 10 and 11 respectively.

Figure 13:
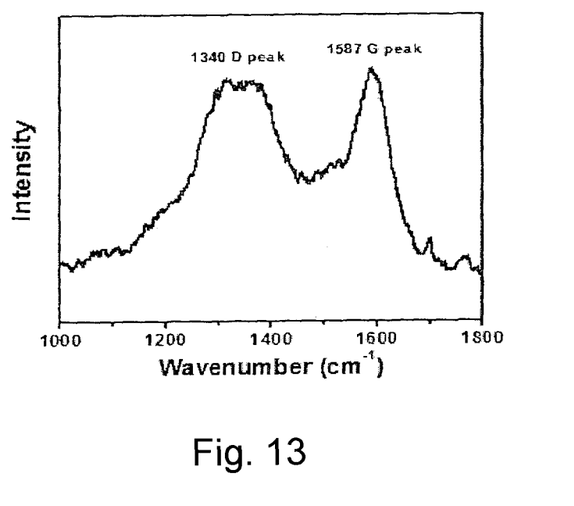
FIG. 13 depicts Raman spectra of the compound obtained by the irradiation of 1-chloro naphthalene.
Figure 14:
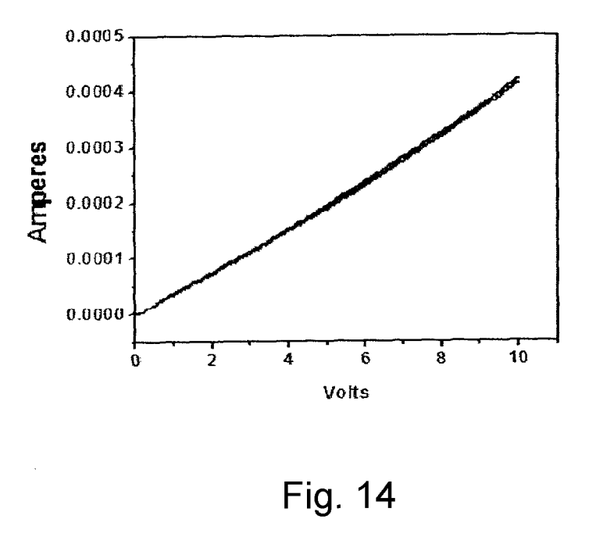
FIG. 14 depicts Current Voltage measurements done on a 24 μm thick film by a two-probe measurements system.
Figure 15:
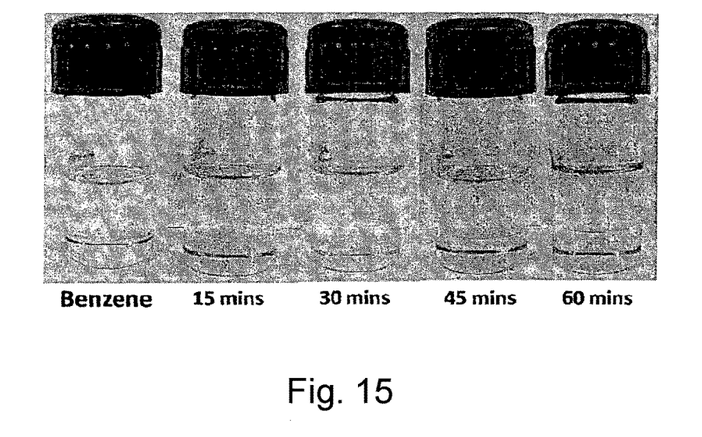
FIG. 15 Control experiment involving irradiation of benzene. No carbon formation was observed confirming that the aromatic ring breakage does not lead to carbon formation. The free radical stitching process in halobenzenes is the confirmed mechanism.

In another embodiment, the present invention provides irradiation of a bicyclic ring containing chlorine. 1-Chloro Naphthalene is used to prove the generic nature of this process. The obtained solid carbon from the liquid precursor is verified by the Raman data of the compound (FIG. 13). The conducting nature of this compound is also checked by the I-V characteristics (FIG. 14).

The Laser-induced Dissociative Stitching process of the instant invention is amenable to localized synthesis wherein the laser power can be focused at the desired spot. It can be tuned by choosing different wavelengths which can be transported into the reactant media over specific short enough length scales and the pulse width. The concentrations of reactants and related dynamics can also be controlled in different ways such as direct addition and mixing or drop wise addition etc.

The present invention is illustrated herein below with examples, which are illustrative only and should not be construed to limit the scope of the present invention in any manner.

EXPERIMENTAL

Materials & Equipment

High purity (GR grade) routine organic solvents Chlorobenzene (CB) and o-Dichlorobenzene (DCB) were obtained from Merck Chemicals and were used as received. A 248 nm KrF excimer laser (Lambda Physic—Germany) with a maximum average power of 40 watts (pulse energy =150 mJ) and a pulse-width of 20 ns was used in the irradiation process.

Example 1

Figure 1:
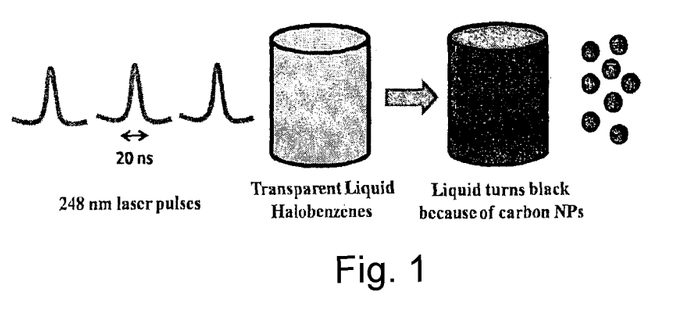
FIG. 1: Figurative depiction of the experimental process.

50 ml of transparent liquid DCB (O-Dichlorobenzene) was irradiated by laser pulse train (KrF UV laser with λ=248 nm and energy density=167 mJ/cm$^2$) (10 Hz) for 10 minutes in a quartz beaker under constant stirring (FIG. 1, schematic). The solution gradually turned black due to the formation of optically absorbing solid state material (FIG. 2, photo). The black solution formed was then filtered through 0.2 μm (pore size) Polytetrafluoroethylene (PTFE) membrane. A black carbonaceous solid was obtained, which was thoroughly characterized. Similarly, 50 ml of liquid CB was irradiated for 30 minutes. Interestingly, CB was noted to take a longer time for the product formation, presumably due to the availability of a single reaction site (C—Cl bond) in comparison with the two sites on DCB.

The so formed carbon nanocomposites and its conducting nature was studied using. X-ray diffraction, Raman spectroscopy and described in FIGS. 2a, 2b and 2c.

In each case, one main very broad peak attributable to the (002) plane of graphite at 2θ=24.45° was observed along with a small hump at 2θ=43.47° corresponding to (100) plane. The XRD data reveals the disordered graphitic nature of the material. The greater the deviation from the ideal graphitic (002) peak position at 26.6°, the greater is the disordered nature of the system. The broad peaks indicate that there is no long range order and point to the presence of graphitic nanoparticles in the system.

In both the cases Raman spectroscopy (FIG. 2(b)) exhibits the usual 'G Band' at 1590 cm$^{-1}$ attributed to the E2g symmetry mode of the sp2 carbon in carbon compounds. A 'D Band' also exists at 1345 cm$^{-1}$. The D band arises due to hexagonal ring systems in the compound and is a forbidden transition. It becomes an allowed transition due to defects in the system. In crystalline compounds like pure graphite, there are very few defects and hence the D band is absent. However with decreasing particle size and increasing defect concentration, the intensity of the D band increases. An intense D band also indicates a larger presence of hexagonal ring systems. In pure amorphous carbon an intense D band does not exist. A shoulder to the G band appears in such systems. It is also clear that decreasing particle size and increasing defects contribute to a greater ID/IG ratio. Since the carbon compounds obtained in the present invention show a high ID/IG ratio (1 in the case of CB and 0.95 in the case of DCB) presence of nanoparticles is therefore clearly suggested.

Figure 2C:
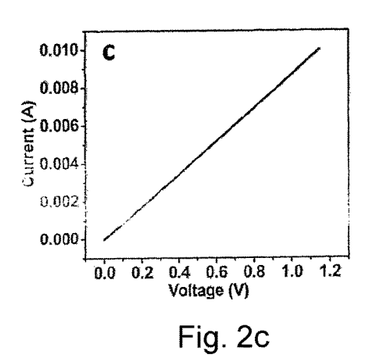
FIG. 2c: depicts the current voltage curve of carbon obtained.

FIG. 2c depicts the current voltage curve of carbon obtained.

Figure 2D:
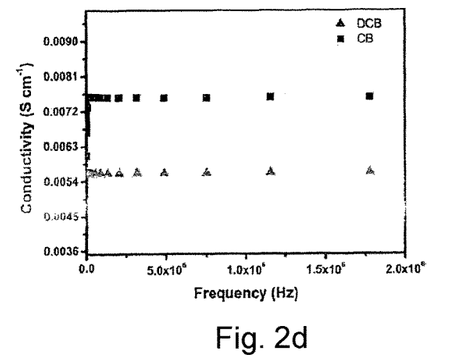
FIG. 2d: depicts conductivity of the CNSs obtained in both cases (DCB and CB).

Further, the frequency dependent conductivity measurements on pellets made from the carbon synthesized by using CB and DCB is explored to determine whether the carbon formed is electrically functional and therefore potentially useful for several applications. The results of conductivity measurements are shown in FIG. 2d. The observed frequency independence of conductivity over the low frequency range clearly establishes the conducting nature of carbon obtained. The conductivity values for carbon synthesized from CB and DCB are about 7.5×10$^{-3}$ and 5.5×10$^{-3}$ S cm$^{-1}$. The good conductivity is estimated due to the ring-stitching nature where the synthesized carbon is configured as an assembly of graphene like sheets.

Figure 3:
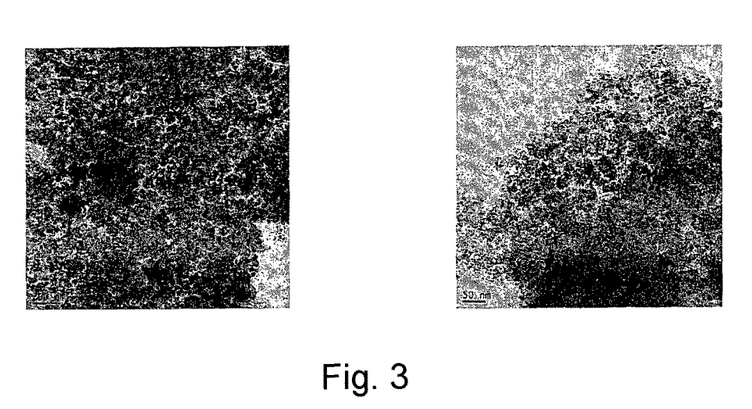
FIG. 3: depicts the TEM images of porous flake like assemblies of carbon nanospheres.
Figure 4:
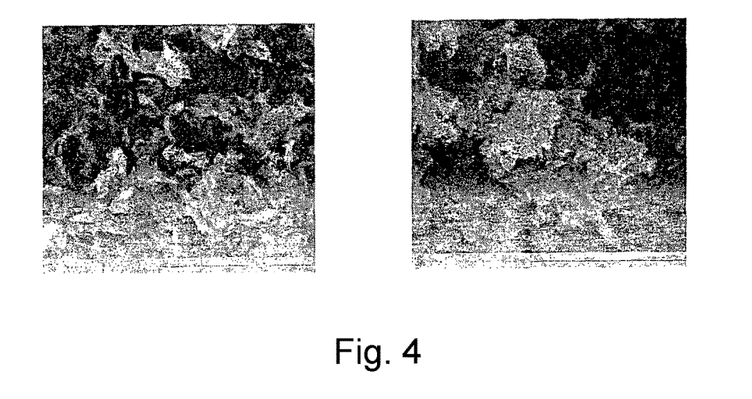
FIG. 4: depicts the SEM images of the carbon compound appearing in a flake like assembly of nanoparticles.

The carbon obtained by irradiation of chlorobenzene and dichlorobenzene formed by the assembly of carbon nanocomposites shows a porous flaky appearance described in FIGS. 3 and 4 (SEM images).

Evidences for the Laser Induced Stitching Process:

Chlorobenzene (CB) and dichlorobenzene (DCB) were irradiated at 248 nm KrF laser pulses to yield the phenyl radicals. That the aromatic radicals formed stitch themselves into graphitic networks were determined by TEM images and time dependent UV-Vis Absorption spectroscopy are described in FIG. 5, FIG. 6, FIG. 8 and FIG. 9.

Figure 5:
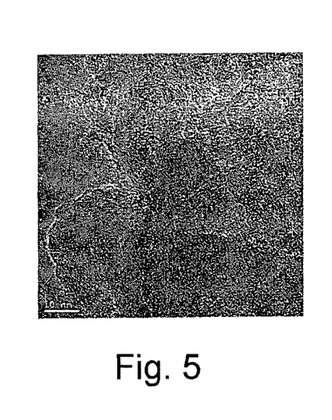
FIG. 5-6: depicts ordered onion like layered nanoparticles of carbon generated initially due to the radical stitching process.
Figure 6:
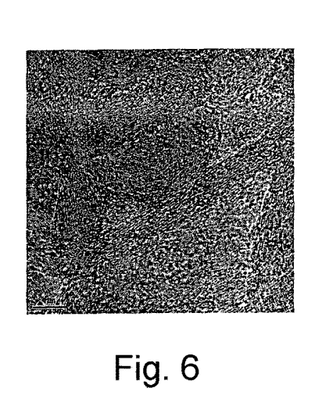

FIGS. 5 and 6 describe ordered onion like layered nanoparticles of carbon generated initially due to the radical stitching process.

Figure 8:
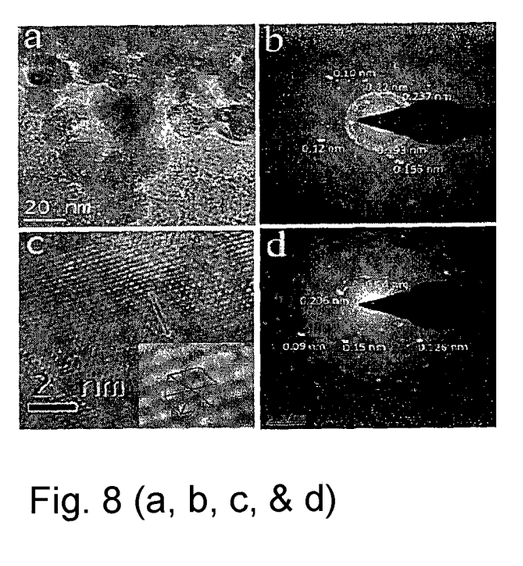
FIG. 8 (a, b, c and d) depicts crystalline form of carbon nanoparticles.

Further, crystalline nanoparticles of carbon obtained in the filtrate after irradiation and filtration process of o-dichlorobenzene are given in FIG. 8 (*a, b* and *c*)

Figure 9:
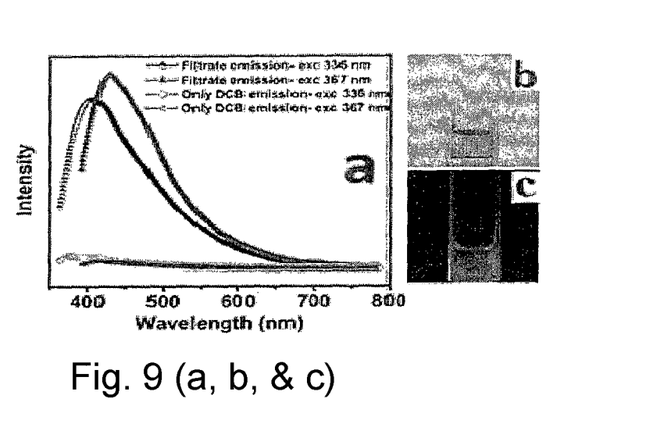
FIG. 9 (a, b and c) depicts photoluminescence current voltage curve.

The filtrate obtained in the process shows a clear strong blue photoluminescence shown in FIG. 9*c* which was absent in the initial DCB. The photoluminescence curve for each case is shown in FIG. 9*a*.

EDAX analysis of carbon obtained from CB and DCB both show an atomic weight percentage of chlorine of 4% and 0.75% respectively. The atomic weight % of chlorine in CB and DCB are estimated to be 31.55% and 48.29% respectively. These statistics prove definitely that there is a loss of chlorine during the process and the dissociative mechanism can be proved correct.

Example 2

The stitching process was further verified using time dependent UV-Visible spectroscopy. 25 ml of o-dichlorobenzene (DCB) was irradiated by pulsed excimer laser (KrF-248 nm) for different time durations such as 1 min, 4 mins, 10 mins and 30 mins separately in a quartz beaker. The black solutions obtained in each case were filtered through 0.2 μm PTFE membrane under vacuum. The filtrates obtained therein were studied by UV-visible spectroscopy (FIG. 7*a*).

Figure 7A:
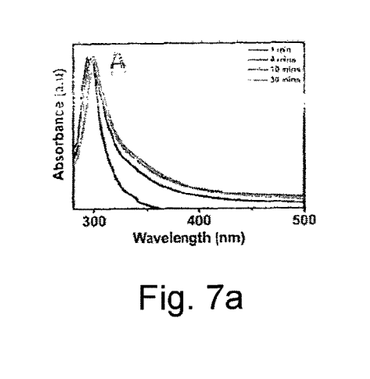
Figure 7B:
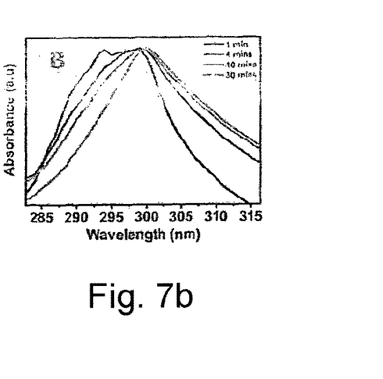

FIG. 7*a*) clearly shows an increased absorption in the visible region with increased time of irradiation. FIG. 7*b*) brings out the red shift with increased time of irradiation. Thus, with increasing size of the graphitic/aromatic network a definite red shift and greater absorption in the visible region is observed.

Example 3

Figure 12:
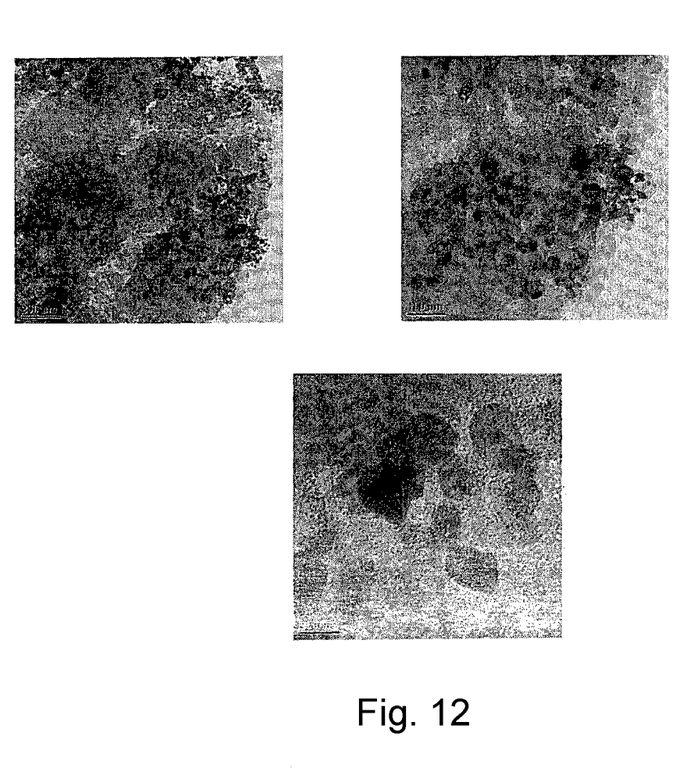
FIG. 12 depicts TEM images of TiO2 nanoparticle decoration of conducting carbon spheres.

To establish even broader applicability of the method, in-situ synthesis of carbon based inorganic nanocomposite Ti/O2-Carbon was prepared by adding TiO2 (Degussa P25) powder to DCB and sonicated. The mixture was then irradiated by 248 nm UV laser pulses with constant stirring for 10 mins. The compound obtained was filtered and then washed by centrifugation by water and acetone (3 times). The nanocomposite of carbon and TiO2 were evaluated by Raman Spectra and TEM images in FIG. 12. Such metal oxide-conducting carbon composite systems have tremendous potential for energy storage applications (ultra-capacitors and Li-ion battery).

In conclusion, the Laser-induced Dissociative Stitching (LSD) offers a new route of synthesizing carbon forms and carbon based nanocomposites at room temperature and mild conditions involving halogen containing, aromatic precursors. The process of the instant invention further provides access to synthesize doped carbon (eg. N doped carbon, S-doped carbon) materials by using heterocyclic aromatic precursors containing halogens. The Laser-induced Dissociative Stitching (LSD) therefore offers a very wide approach in science of carbon synthesis.

Thus a novel PLPS (Pulsed Laser-induced Photochemical Stitching) process is introduced by the present invention to engineer solid carbon nanoparticles from liquid halobenzenes by laser photochemistry at room temperature and laboratory environment. Electrically conducting high surface area carbon nano-spheres (CNSs) have thus been directly synthesized from routine laboratory solvents (which if discarded would be simply a toxic waste). Furthermore, in principle, a complete conversion of liquid materials (CB & DCB) to solid carbon can be achieved by a cyclic process of solvent irradiation and distillation to recycle the solvent followed by further irradiation, which we have confirmed. PLPS can thus prove to be a highly efficient route of nano-carbon synthesis.

It can also be foreseen that the demonstrated technique would be a generic pathway for generating a variety of carbon nanomaterials from halogen containing reactants at variable irradiation conditions as well as carbon-based nanocomposites by in-situ synthesis involving concurrent presence of other precursors, organic molecules, polymers or nanoparticles in the solvent. Laser photochemical synthesis does not require high temperature that is usually associated with the synthesis of carbon based materials facilitating the synthesis of carbon nanocomposites with polymers and other organic compounds. Moreover, being a laser process it is applicable for direct-write schemes of localized synthesis.

ADVANTAGES OF PRESENT INVENTION

1. Several new morphologies can be made using different haloaromatic precursors
2. Room temperature carbon process
3. Carbon composites and Doped carbon nanomaterials can be obtained by these methods

The invention claimed is:

1. A process for the synthesis of carbon and carbon based nanocomposites using Laser-induced Dissociative Stitching (LDS) of liquid halogen containing aromatic compounds at room temperature, wherein halogen based free radicals are dissociated from the aromatic compounds and introduced to a graphitic network.

2. The process according to claim 1, wherein the Laser-induced Dissociative Stitching process comprises irradiating the liquid halogen containing aromatic compounds with an excimer laser source having a pulse repetition frequency ranging from about1Hz to about 50 Hz.

3. The process according to claim 2, wherein the excimer laser source comprises a noble gas halide type excimer laser source.

4. The process according to claim 2, wherein the excimer laser source is selected from the group consisting of: KrF (248nm), XeCl (308nm), and ArF (193nm).

5. The process according to claim 2, wherein the excimer laser can be operated either in continuous wave (CW) or pulsed mode of operation.

6. The process according to claim 1, wherein the Laser-induced Dissociative Stitching process comprises layered, crystalline onion-like intermediates to obtain solid carbon and carbon based nanocomposite material.

7. The process according to claim 1, wherein the liquid halogen containing aromatic compounds are selected from the group consisting of: chlorobenzene, o-Dichlorobenzene, bromobenzene, p-dichlorobenzene and biphenyl containing halogen.

8. The process according to claim 1, wherein the liquid halogen containing aromatic compounds comprise constituent materials or their precursors, wherein carbon binds with the constituent materials to produce corresponding carbon based nanocomposites.

9. The process according to claim 8, wherein the constituent materials comprise polymers, inorganic compounds and/or other organic compounds.

10. The process according to claim 1, wherein the process does not involve breakage of carbon bonds in an aromatic ring.

11. A laser photochemical process for the synthesis of carbon and carbon-based nanocomposites, comprising:
    exposing liquid halogen-containing aromatic compounds to a source of radiation at room temperature to dissociate carbon-halogen bonds and to generate halogen based free radicals; and
    integrating the halogen based free radicals into a graphitic network to provide a carbon or carbon-based nanocomposite.

12. The process according to claim 11, wherein the source of radiation comprises an excimer laser source with a pulse repetition frequency ranging from about 1Hz to about 50 Hz.

13. The process according to claim 12, wherein the excimer laser source is KrF, XeCl, and ArF.

14. The process according to claim 12, wherein the excimer laser can be operated either in continuous wave (CW) or pulsed mode of operation.

15. The process according to claim 11, wherein the process comprises forming layered, crystalline onion-like intermediates to obtain the carbon or carbon-based nanocomposite.

16. The process according to claim 11, wherein the carbon-based nanocomposite is air stable up to 400 to 450° C.

17. The process according to claim 11, wherein the liquid halogen-containing aromatic compounds are selected from the group consisting of chlorobenzene, o-Dichlorobenzene, bromobenzene, p-dichlorobenzene, and biphenyl containing halogen.

18. The process according to claim 11, wherein the liquid halogen-containing aromatic compounds comprise constituent materials or their precursors, wherein carbon binds with the constituent materials to produce corresponding carbon-based nanocomposites.

19. The process according to claim 18, wherein the constituent material comprises polymers, inorganic compounds, and/or other organic compounds.

20. The process according to claim 11, wherein the process does not involve breakage of carbon bonds in an aromatic ring.

* * * * *